United States Patent [19]
Gaddis et al.

[11] Patent Number: 5,553,501
[45] Date of Patent: Sep. 10, 1996

[54] VIBRATION TESTING ON ROTATING MACHINE COMPONENTS

[75] Inventors: William T. Gaddis, Palm Beach Gardens; Kenneth I. Nelson, Stuart, both of Fla.; Gary W. Thomas, Louisville, Ky.

[73] Assignee: United Technologies Corporation, Hartford, Conn.

[21] Appl. No.: 350,217

[22] Filed: Dec. 5, 1994

[51] Int. Cl.⁶ .................................................. G01M 7/02
[52] U.S. Cl. ........................................ 73/662; 73/571
[58] Field of Search .......................... 73/662, 663, 665, 73/666, 667, 668, 671, 672, 571, 577, 579, 583, 660

[56] References Cited

U.S. PATENT DOCUMENTS

| | | | |
|---|---|---|---|
| 2,384,987 | 9/1945 | Dudley | 73/662 |
| 2,404,965 | 7/1946 | Kilgore et al. | 73/662 |
| 3,067,345 | 12/1962 | Harris | 73/662 |
| 4,240,141 | 12/1980 | Vasiliev et al. | 73/664 |

*Primary Examiner*—John E. Chapman
*Attorney, Agent, or Firm*—Robert E. Greenstien

[57] ABSTRACT

A stack of piezoelectric crystals is placed on a shaft that is rotated to test a component on the shaft. An electrical signal is supplied to the stack, causing the crystals to vibrate, sending vibrations to the component as it spins. The component is enclosed in a vacuum chamber in order to provide a reduced pressure and thereby to reduce the power required to spin the component.

7 Claims, 2 Drawing Sheets

5,553,501

VIBRATION TESTING ON ROTATING MACHINE COMPONENTS

TECHNICAL FIELD

This invention relates to techniques for performing vibration testing on balanced rotating components, for instance the turbine blades and disks that are used in gas turbine engines.

BACKGROUND OF THE INVENTION

In many applications, such as gas turbine engines, rotating components, such compressor and turbine disks, are subjected to high speed rotational (spin) testing to detect imbalances and structural abnormalities at different design and testing stages. Current techniques in the state of the art do not provide high level, continuous vibratory spin excitation, the excitation typically is extremely transient. In other words, these techniques do not provide a realistic simulation of actual engine vibration conditions. A variety of sources produce different engine vibrations during actual engine operation.

The capability to excite rotating components (hardware) dynamically during experimental/design testing provides a significant advantage by demonstrating possible high level component responses that may cause expensive engine damage and time out of service. Prior art approaches have used electromagnets and air jets to impart vibrations to the spinning disk. But, electromagnets overheat, besides not being very powerful ( taking into account realistic costs for the electromagnets and associated power supplies). Continuous use of adequate electromagnets during extensive spin testing can require exotic magnet cooling schemes. Generally, air jets are useful only for mono-frequency testing, and the test data is transient (temporary) because the air jet decelerates the rotating disk.

Piezoelectric devices are capable of imparting mechanical energy (vibrations) to objects in response to an electrical signal. These devices have broad bandwidth characteristics and have been used for stationary fatigue testing, U.S. Pat. No. 3,563,086 being an example.

DISCLOSURE OF THE INVENTION

The objects of the present invention include providing a superior way to perform vibratory testing on rotating components using electromechanical devices that are capable of producing broad band vibrations for sustained periods.

According to the present invention, a component, such as a turbine disk, is attached to a shaft that is rotated, e.g., by an electric motor or air turbine. Electrically controlled transducers are attached to the shaft and are connected to an external electronic control through a slip ring. The electronic control provides variable AC to the transducers, causing them to oscillate at the input voltage frequency. The oscillation produces vibrations that are transmitted to component.

According to the invention, the transducers are piezoelectric crystals that are mounted in a stack with the shaft.

According to the invention, the stack is located at one end of the shaft, to be as far as possible from the drive. The slip ring is located at the other (opposite) end of the shaft.

According to the invention, the stack and the component are spun at high speed, e.g. 15,000 RPM in a vacuum chamber. The stack is housed in a sealed housing on the shaft which is vented to the outside to maintain the interior of the stack at standard atmospheric pressure. This prevents high voltage arcing between the stack electrodes.

A feature of the invention is that the frequency of the vibrations can be varied over a wide range, due to the broad bandwidth of piezoelectric crystals, and the piezoelectric transducers can operate continuously. Other objects, benefits and features of the invention will be apparent to one skilled in the art from the following discussion of the invention.

BRIEF DESCRIPTION OF THE INVENTION

BEST MODE FOR CARRYING OUT THE INVENTION

Figure 1:
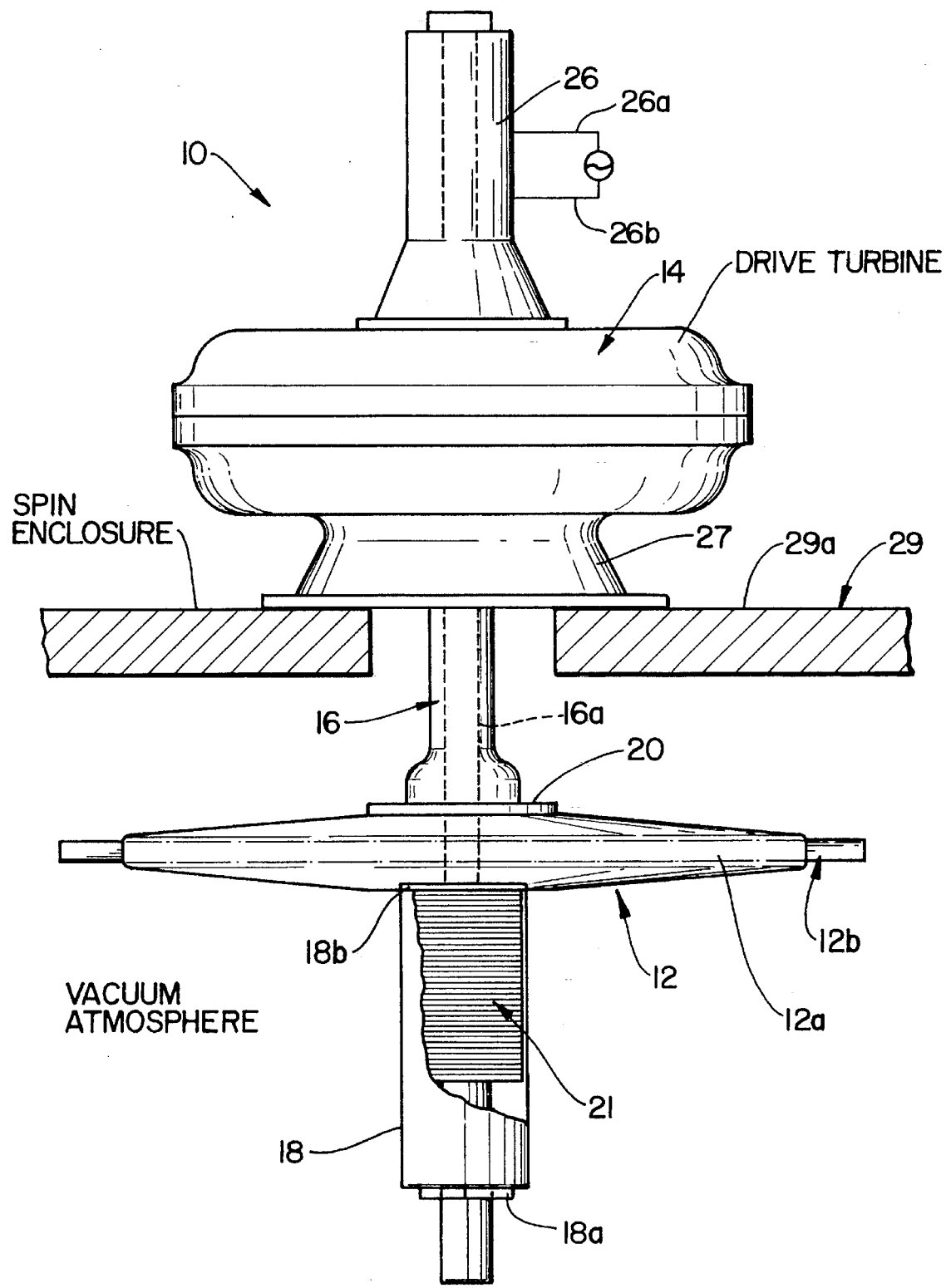
FIG. 1 is a plan view of an apparatus for inducing vibrations in a spinning component according to the present invention.
Figure 2:
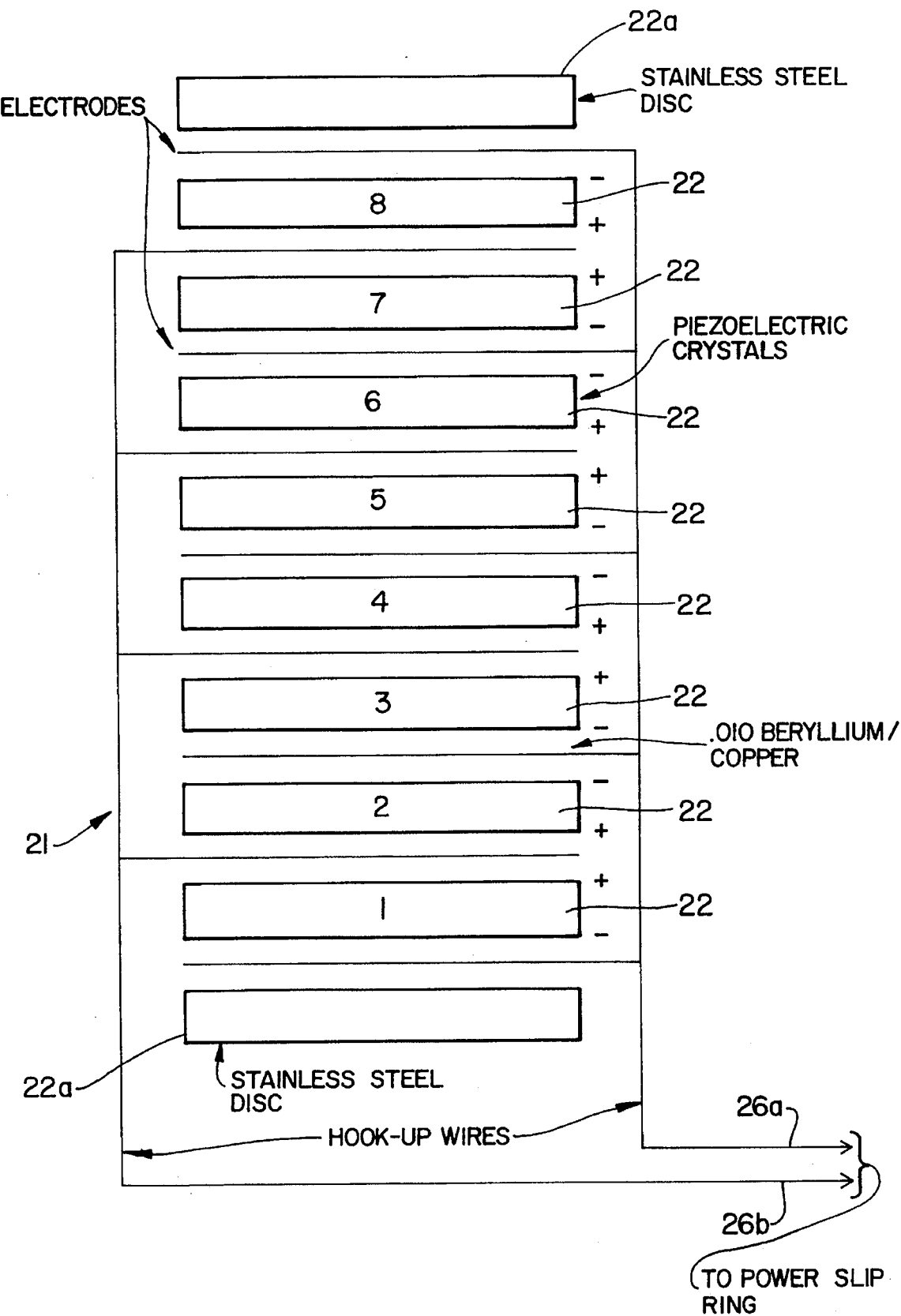
FIG. 2 is a schematic showing a transducer stack of piezoelectric crystals included in the apparatus shown in FIG. 1.

FIG. 1 shows a device 10 for spinning a component 12, such as the turbine disk 12a and attached blades 12b. A motor 14 rotates a shaft 16 and a housing 18. An air turbine may used for the drive. An end plate 20 provides a jig for the turbine disk and serves to couple the motor to the shaft. A "crystal stack" 21 of sandwiched piezoelectric crystals 22 is located inside the housing. The stack 21 is located at one end of the shaft, as far as possible from the motor 14. As discussed below, this stack 21 is excited to vibrate, creating vibrations that are transmitted to the disk 12a. FIG. 2 illustrates the stack 21 in greater detail. AC electric power is input to each crystal 22, and the crystals vibrate as a function of the input power frequency, inducing vibrations to the spinning turbine disk. The AC power is supplied over wires 26a, 26b to the stack 21 via a slip ring assembly 26. The wires from the slip ring are not shown but should be presumed to extend from the slip ring to the stack. A support mechanism, such as bearing brackets are required but are not discussed here, not being germane to the present invention. A suitable slip ring assembly is produced by Quality Aero Technology, Inc, Raleigh N.C., slip ring M/N 24200451. The device 10 contains a base 27, which rests on the top 29a of a spin enclosure 29. The housing 18 is sealed at 18a and 18b against the reduced pressure in the enclosure 29, in which the test takes place. Less than normal atmospheric pressure is needed to reduce the power required to spin the component 12. The shaft is hollow (dotted lines 16a) to route the wires (not shown) to the stack and maintain the interior of the stack at the normal atmospheric pressure, outside the enclosure 29.

Referring once again to FIG. 2, it can be seen that the stack comprises a plurality of the piezoelectric crystals 22 located between two stainless steel disks 22a and are separated by 0.010 Beryllium/copper terminals connected in the parallel circuit configuration that is shown. The positive and negative terminals of the supply line 26a, 26b are connected to the positive and negative side of each crystal. The total vibratory excitation imparted to the component (the disk 12a) is determined by the number of crystals. The frequency of the AC signal determines the vibratory excitation frequency. The crystal stock provide significant gain between the input voltage and output vibration power. For example, a crystal stack comprised of sixty two inch diameter by 0.100 inch thick lead zirconate disks will provide 100 g vibratory excitation over a frequency range of 500–10,000 Hz from 1000 volts AC input, which has been used to test at 18,000 RPM a second stage turbine disk with a diameter of twenty-four inches.

To perform a test, the motor is energized, spinning the disk 12a. The enclosure may be partially evacuated during the test to reduce the load on the drive, as noted, and the stack is held at atmospheric pressure by reason of being in the sealed housing that is connected by the bore 16a to the area outside the enclosure 29. While the disk is spinning at a selected speed, the AC power is supplied through the slip ring to the stack. The stack starts to vibrate, as a function of the frequency of the AC power. These vibrations are transmitted to the disk 12a. The magnitude and frequency of the AC power can be varied to change the vibration characteristics.

From the foregoing discussion of one or more embodiments of the invention, one of ordinary skill in the art may be able to make modifications, in whole or in part, to such embodiments without departing from the true scope and spirit of the invention.

We claim:

1. Apparatus comprising a motor, a shaft rotated by the motor and means for attaching a component to the shaft; characterized by:

a plurality of piezoelectric crystals in a stack attached to a first end of the shaft and in parallel electrical connection;

a slip ring on the shaft for providing electrical power to the piezoelectric crystals, the slip ring being located at a second end of the shaft;

a power supply for providing electric power to the slip ring to induce the crystals to vibrate;

a jig on the shaft to receive the component; and the motor being located between the slip ring and the component, and the jig being located between the stack and the motor.

2. Apparatus comprising a shaft, means for rotating the shaft and means for attaching a component to the shaft, characterized by:

first means for producing vibrations in the shaft in response to an electrical signal, said first means being mounted on the shaft;

second means for providing the electrical signal to said first means and; third means for permitting the creation of less than atmospheric pressure around said component and maintaining a different pressure around said first means.

3. The apparatus described in claim 2, further characterized in that:

the first means comprises a stack comprising piezoelectric crystals.

4. The apparatus described in claim 3, further characterized in that:

the second means comprises a power supply for providing the electrical signal and a slip ring on the shaft for transmitting the electrical signal to the first means.

5. The apparatus described in claim 1, further characterized in that:

the crystals are located in a housing that is sealed;

the jig and stack are located in a vacuum chamber; and the shaft contains a bore by which air pressure is maintained at a selected level in the stack.

6. A method for testing a rotating component comprising:

placing the component in a jig on a shaft and spinning the shaft;

imparting vibrations to the shaft from piezoelectric crystals mounted on the shaft in response to an electric signal; and providing said electrical signal as the shaft rotates.

7. The method described in claim 6, further characterized by:

locating said jig and said stack in a vacuum chamber; and maintaining air pressure at a selected level in said stack through a bore in said shaft.

* * * * *